United States Patent
Yang

(10) Patent No.: US 8,196,468 B2
(45) Date of Patent: Jun. 12, 2012

(54) VIBRATION SENSOR

(75) Inventor: Song-Ling Yang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 311 days.

(21) Appl. No.: 12/693,386

(22) Filed: Jan. 25, 2010

(65) Prior Publication Data

US 2010/0326190 A1 Dec. 30, 2010

(30) Foreign Application Priority Data

Jun. 26, 2009 (CN) .......................... 2009 1 0303746

(51) Int. Cl.
*G01C 19/56* (2012.01)
(52) U.S. Cl. ..................................... 73/504.15
(58) Field of Classification Search .............. 73/504.15, 73/504.02, 504.12, 504.29
See application file for complete search history.

(56) References Cited

U.S. PATENT DOCUMENTS

| | | | | |
|---|---|---|---|---|
| 4,930,351 A | * | 6/1990 | Macy et al. | 73/504.04 |
| 5,450,751 A | * | 9/1995 | Putty et al. | 73/504.18 |
| 7,350,421 B2 | * | 4/2008 | Anklin-Imhof et al. | 73/861.355 |
| 7,562,585 B2 | * | 7/2009 | Schuetze et al. | 73/861.355 |
| 7,657,947 B2 | * | 2/2010 | Reinstadtler et al. | 850/33 |

* cited by examiner

*Primary Examiner* — J M Saint Surin
(74) *Attorney, Agent, or Firm* — Altis Law Group, Inc.

(57) ABSTRACT

A vibration sensor includes a base, a conducting ring, a number of cantilevers, a number of resistors, a number of helical springs, and a number of pairs of first and second pins. One end of each cantilever is connected to the base; the other end of each cantilever defines a guiding cutout. The resistors are correspondingly inserted in the guiding cutout. The helical springs are correspondingly deposited between the conducting ring and the holding block. The conducting ring slides in the guiding cutout due to a vibration and contacts with the resistor. The first and second pins formed in the base for correspondingly connecting to a pair of resistors in each cantilever. The vibration sensor senses the direction of the vibration by detecting a resistance that changes with a position of the conducting ring.

9 Claims, 5 Drawing Sheets

VIBRATION SENSOR

BACKGROUND

1. Technical Field

The present disclosure relates to sensors and, particularly, to a sensor for sensing vibrations.

2. Description of Related Art

Nowadays, more and more electronic products use a gyro sensor to sense vibrations. However, most gyro sensors are made by the micro electro-mechanical system technology (MEMS) and are complicated. Accordingly, the cost of the gyro sensor is high.

Therefore, it is desirable to provide a vibration sensor which can overcome the above-mentioned problems.

BRIEF DESCRIPTION OF THE FIGURE

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
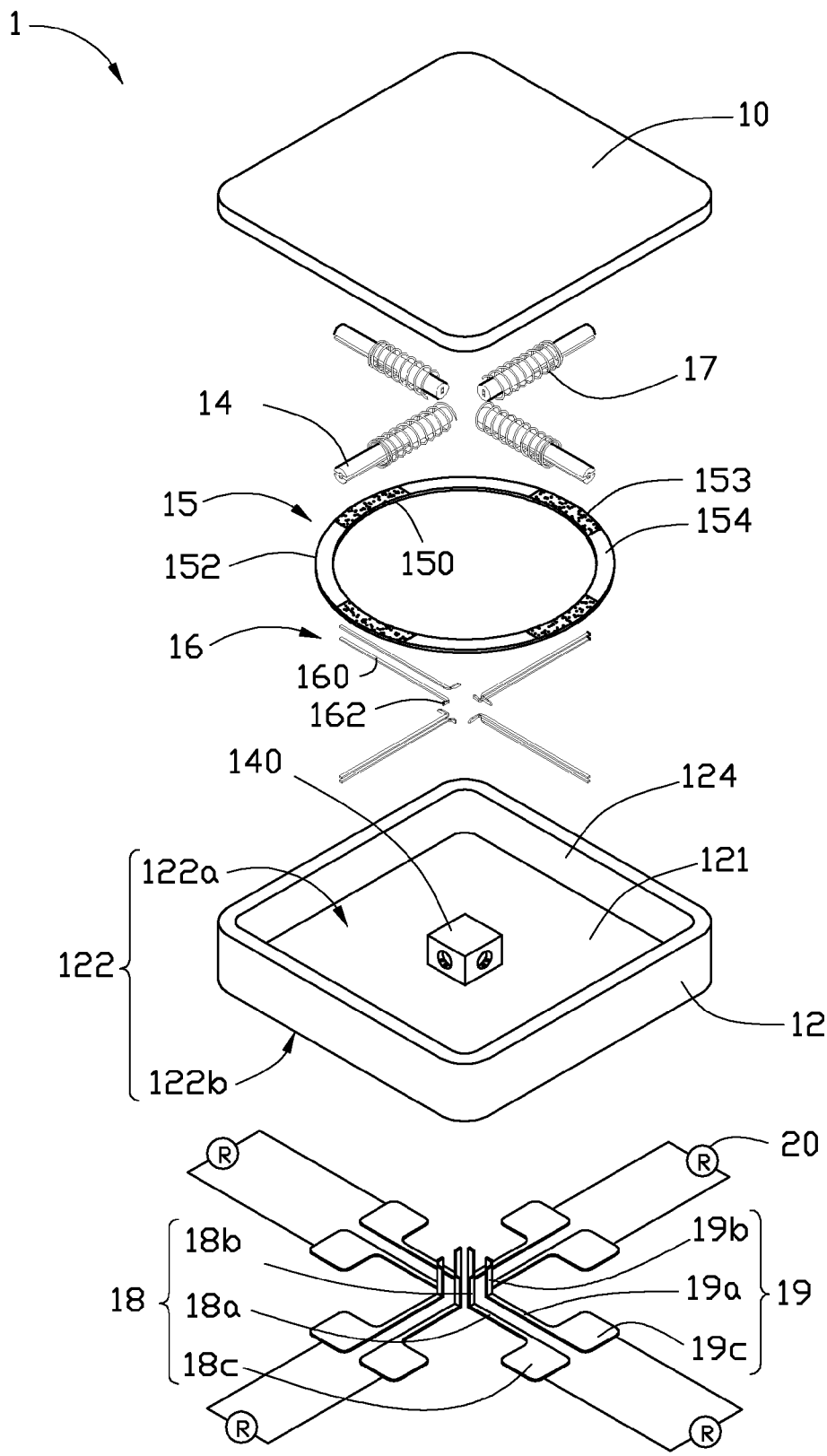
FIG. 1 is an exploded, isometric view of an exemplary embodiment of a vibration sensor.
Figure 2:
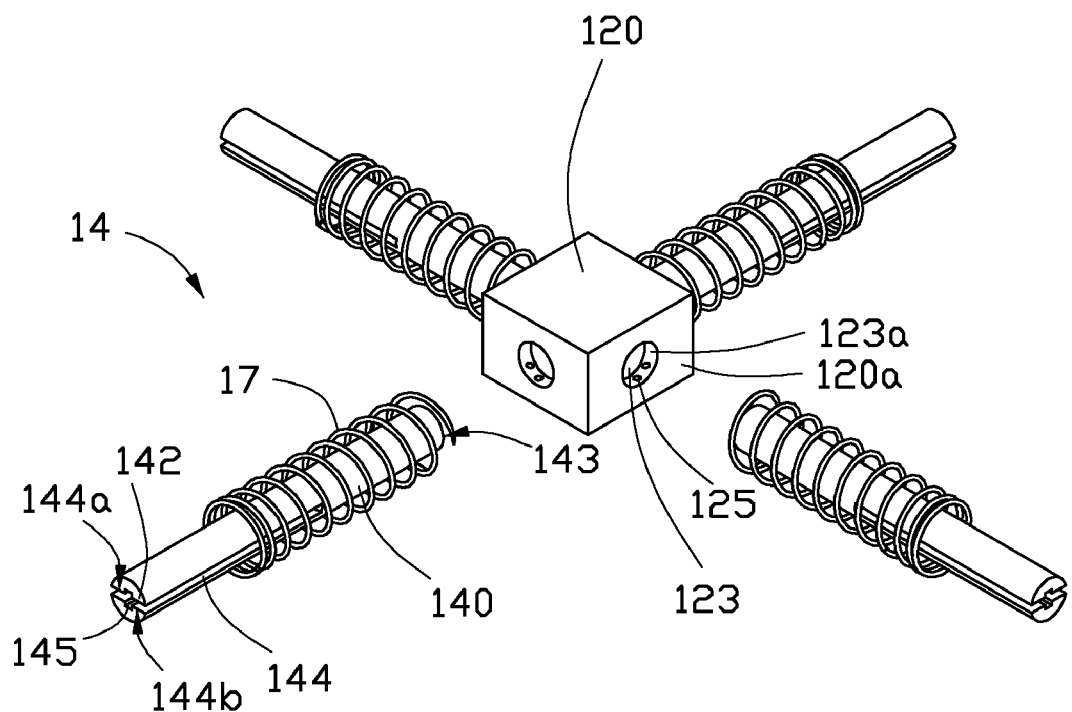
FIG. 2 is an isometric view of a holding block and a number of cantilevers of the vibration sensor of FIG. 1.

Referring to FIGS. 1-2, a vibration sensor 1, according to an exemplary embodiment, is illustrated. The vibration sensor 1 is configured for sensing vibrations and includes a base 12, a cover 10, a conducting ring 15, a number of cantilevers 14, a number of resistors 16, a number of helical springs 17, a number of pairs of first pins 18 and second pins 19, and a number of resistance meter 20 correspondingly connected to each pair of the first pin 18 and the second pin 19.

The base 12 is substantially a rectangular case and includes a holding block 120, a bottom sheet 122, and a sidewall 124 perpendicularly connected to the peripheral edges of the bottom sheet 122. The bottom sheet 122 and the sidewall 124 cooperatively define a receiving space 121 for accommodating the cantilevers 14, the conducting ring 15, and the resistors 16.

The bottom sheet 122 includes an inner bottom surface 122a and an outer bottom surface 122b. The holding block 120 extends upwards perpendicularly to a center part of the inner bottom surface 122a. The holding block 120 is cubic in shape and includes four outer sidewalls 120a connected perpendicular to the inner bottom surface 122a. The holding block 120 defines a blind hole 123 in a center of each outer sidewall 120a. In this embodiment, the holding block 120, the bottom sheet 122, and the sidewall 124 are integrally made of insulation.

Each blind hole 123 defines an inner sidewall 123a. The holding block 120 defines two through holes 125 on the inner sidewall 123a. Each blind hole 123 communicated with the outer bottom surface through the through hole 125.

The cover 10 is substantially a rectangular sheet corresponding to the base 12 in shape and size. The cover 10 is configured for covering the receiving space 121.

The cantilever 14 is substantially an elongated cylindrical rod and includes a cylindrical side surface 140, a first end surface 142, and a second end surface 143. The second end surface 143 is opposite to the first end surface 142. The cantilever 14 defines a guiding cutout 144 in the first end surface 142. The guiding cutout 144 extends from the first end surface 142 and along the longitudinal direction of the cantilever 14 with a predetermined distance from the first end surface 142. The guiding cutout 144 also communicates with diametrically the opposite side surface 140 of each cantilever 14.

The guiding cutout 144 includes a first inner surface 144a and a second inner surface 144b parallely spaced from the first inner surface 144a. The cantilever 144 defines a receiving slot 145 in the first inner surface 144a and the second inner surface 144b. The receiving slot 145 extends along the longitudinal direction of the cantilever 14 from the first end surface 142 to the second end surface 143.

The resistor 16 includes a main body 160 and a connecting end 162. The connecting end 162 is bent perpendicularly to one end of the main body 160 for connecting to the first pin 18 and the second pin 19.

The conducting ring 15 is a flat circular ring and includes an inner peripheral side 150, an outer peripheral side 152, a number of conducting parts 153 made of a conducting material, and a number of insulation parts 154 made of insulation. The conducting parts 153 and the insulation parts 154 are circular segments of the conducting ring 15 interspaced with each other. The number of conducting parts 153 is in accordance with the number of the cantilevers 14. The thickness of the conducting ring 15 is substantially in accordance with a distance between the first inner surface 144a and the second inner surface 144b of the cantilever 14.

The first pin 18 includes a first connecting rod 18a, a second connecting rod 18b, and a first connecting pad 18c. The second connecting rod 18b is connected perpendicularly to one end of the first connecting rod 18a. The first connecting pad 18c is substantially a rectangular flat pad. The first connecting pad 18c extends along a direction perpendicular to the first connecting rod 18a and the second connecting rod 18b. The first connecting pad 18c extends from the end of the first connecting rod 18a that is opposite to the second connecting rod 18b.

The second pin 19 is substantially similar to the first pin 19 in shape and includes the counterparts of the first pin 18, for example: a third connecting rod 19a, a fourth connecting rod 19b, and a second connecting pad 19c. The second connecting pad 19c extends along a direction opposite to the first connecting pad 18c. In this embodiment, four first pins 18 and four second pins 19 are employed.

Figure 3:
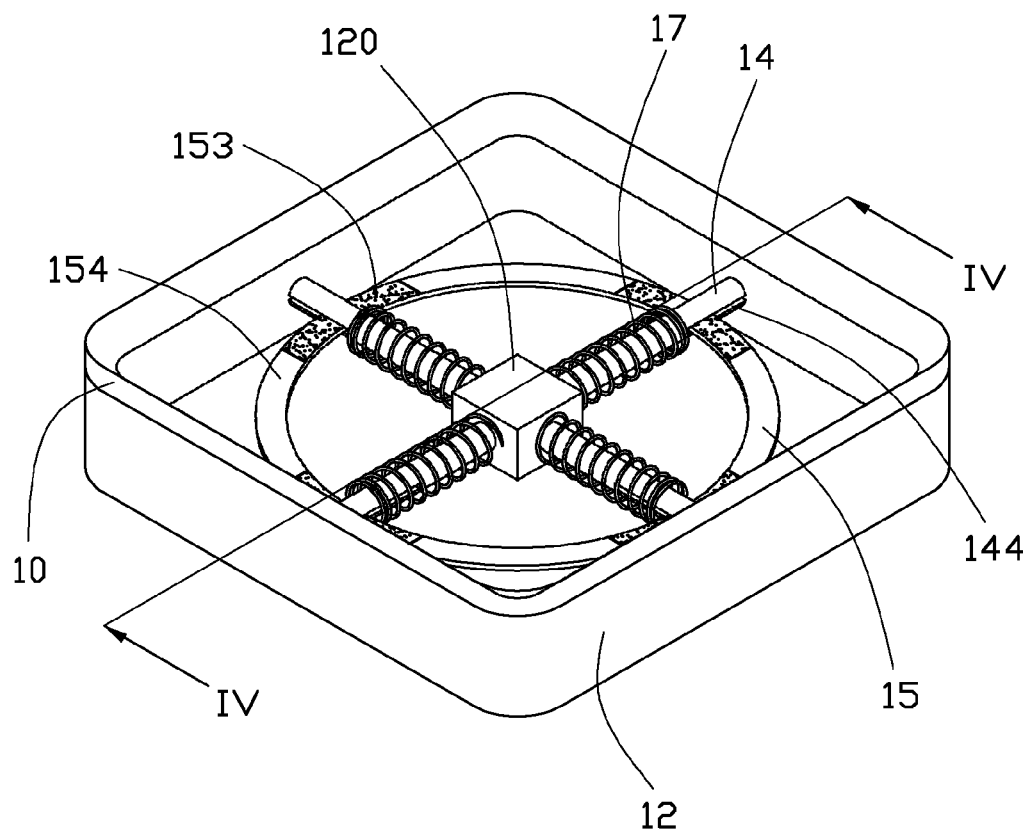
FIG. 3 is an assembled, isometric view of the vibration sensor of FIG. 1.
Figure 4:
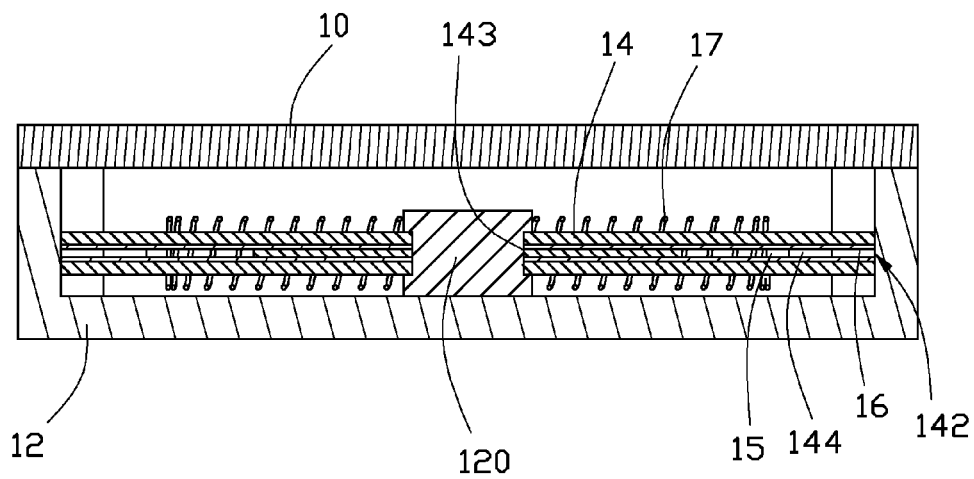
FIG. 4 is a cross-sectional, isometric view taken along line an IV-IV of FIG. 3.
Figure 5:
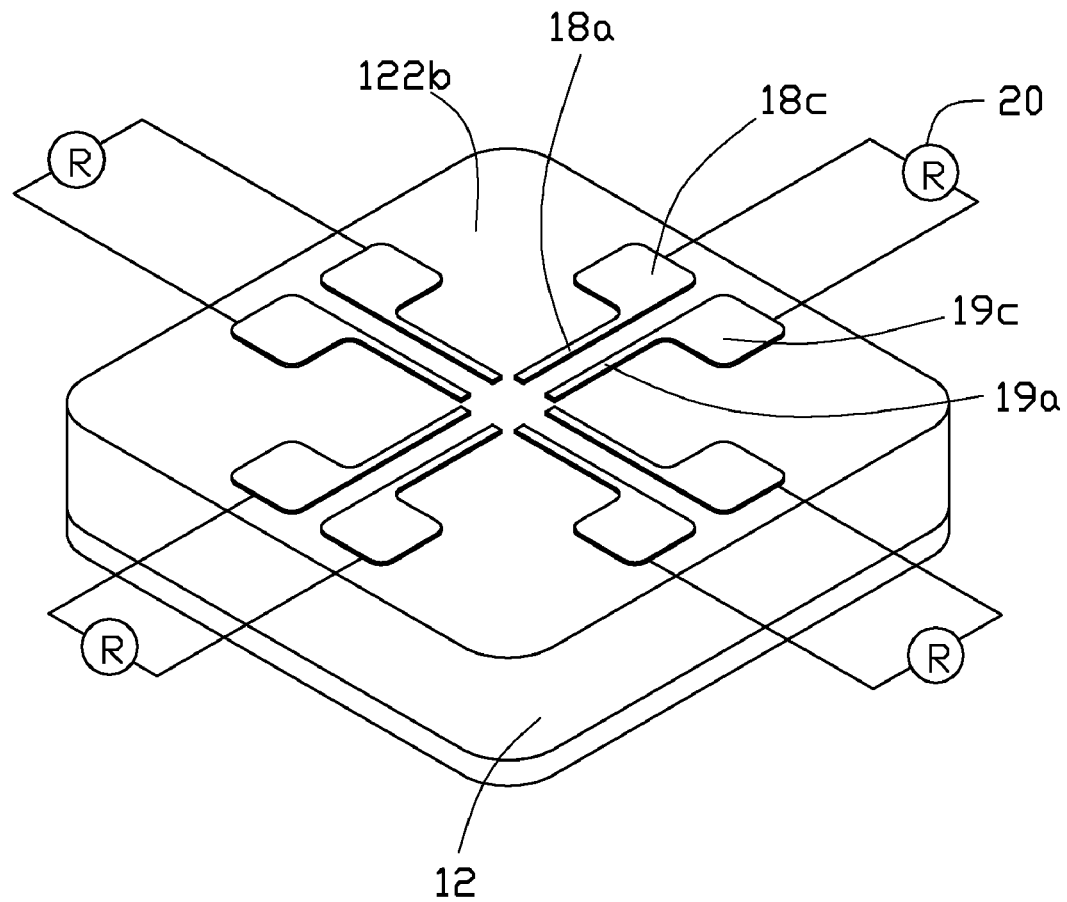
FIG. 5 is an assembled, isometric view of the vibration sensor of FIG. 3, viewed at a different angle.

Referring to FIGS. 3-5, in assembly, the second connecting rods 18b and the fourth connecting rods 19b get through two of the through holes 125 from the outer bottom surface 122b to the blind holes 123 correspondingly. The distal end of the second connecting rod 18b and the distal end of the fourth connecting rod 19b protrudes into the blind holes 123 of the holding block 120. The main bodies 160 of the resistors 16 are correspondingly inserted and received in the receiving slots 145. The connecting ends 162 of the resistors 16 contacts with the second end surface 143.

The helical springs 17 are correspondingly sleeved on the cantilevers 14. The conducting ring 15 is clipped in the guiding cutouts 144 of each cantilever 14. The conducting parts 153 of the conducting ring 15 correspondingly contact with the resistor 16 received in the receiving slots 145. The second end surfaces 143 of the cantilevers 14 are correspondingly inserted into the blind holes 123. The connecting ends 162 of the resistors 16 in the same cantilever 14 are correspondingly connected to the second connecting rods 18b and the fourth connecting rods 19b.

The helical springs 17 are compressed by the inner peripheral side 150 of conducting ring 15 and the outer sidewalls 120a of the holding block 120. The conducting ring 15 slidably contacts with the resistors 16 received in the receiving slots 145. The cover 10 is deposited on the base 12 for covering the receiving space 121.

In practice, the vibration sensor is installed in an object to detect the vibration of the object. Each pair of the first pin 18 and the second pin 19 correspondingly connects to the resistance meter 20. A part of each resistor 16 between the connecting end 162 and the conducting ring 15 is correspondingly connected to the resistance meter 20 to form a closed circuit.

When the object is at rest, the center of the conducting ring 15 is aligned with the center of the base 12. The resistance of each of the resistors 16 connected into the closed circuit in each cantilever 14 is the same.

When the object vibrates, the conducting ring 15 slides in the guiding cutout 144 due to the corresponding movement of the vibration sensor 1. The resistance of each of the resistors 16 connected into the closed circuit in the different cantilevers 14 changes because the ring 15 will slide along the lengthwise direction of the resistor thereby increasing or decreasing the resistance. The resistance changes according to the direction of the vibration. Therefore, the vibration can be sensed by detecting the changes in resistance of each close circuit.

While various exemplary and preferred embodiments have been described, it is to be understood that the invention is not limited thereto. To the contrary, various modifications and similar arrangements (as would be apparent to those skilled in the art) are intended to also be covered. Therefore, the scope of the appended claims should be accorded the broadest interpretation so as to encompass all such modifications and similar arrangements.

What is claimed is:

1. A vibration sensor comprising:
    a base defining a receiving space and comprising a holding block formed at a center of a bottom of the receiving space;
    a plurality of cantilever, each cantilever of the plurality of cantilevers comprises a cylindrical side surface, a first end surface, and a second end surface opposite to the first end surface, each cantilever of the plurality of cantilevers connects to the holding block via the second end surface, each cantilever of the plurality of cantilevers defines a guiding cutout extending from the first end surface and along the longitudinal direction of the cantilever with a predetermined distance from the first end surface, the guiding cutout communicates with diametrically opposite side surface of each cantilever of the plurality of cantilevers, the guiding cutout comprising two inner surfaces parallel spaced from each other;
    a plurality pairs of resistors, each pair of resistors correspondingly received in the inner surfaces from the first end surface to the second end surface, the second end surface of the cantilever connects to the holding block;
    a conducting ring clipped in the guiding cutouts and slidably contacting with the resistors, the conducting ring comprises a number of conducting parts made of a conducting material, and a number of insulation parts made of insulation, the conducting parts correspondingly contacts with the resistor received in each cantilever;
    a plurality of helical springs correspondingly sleeved on each cantilever and being compressed by the conducting ring and the holding block;
    a plurality pairs of first and second pins formed in the holding block for correspondingly connected to the resistors in each cantilever;
    a plurality of resistance meter correspondingly connected to each pair of first and second pins; and
    a cover deposited on the base for covering the receiving space.

2. The vibration sensor as claimed in claim 1, wherein the base is substantially a rectangular case and comprises a bottom sheet and a sidewall perpendicularly connected to the peripheral edges of the bottom sheet, the bottom sheet and the sidewall cooperatively defines the receiving space, the bottom sheet comprises an inner bottom surface and an outer bottom surface, the holding block extends upwards perpendicularly to a center of the inner bottom surface.

3. The vibration sensor as claimed in claim 2, wherein the holding block, the bottom sheet, and the sidewall are integrally made of insulation.

4. The vibration sensor as claimed in claim 2, wherein the holding block is rectangular in shape and comprises four outer sidewalls perpendicular connected to the inner bottom surface, the holding block defines a blind hole in a center of each outer sidewall, each blind hole defines an inner sidewall, the holding block defines two through holes on the inner sidewall, each blind hole communicate with the outer bottom surface through the through hole.

5. The vibration sensor as claimed in claim 4, wherein each of the first and second pins comprises a first connecting rod, a second connecting rod, and a connecting pad, the second connecting rod is perpendicularly connected to one end of the first connecting rod, the connecting pad is substantially a rectangular flat pad, the connecting pads of the positive and second pins correspondingly extend along two opposite directions perpendicular to the first connecting rod and the second connecting rod.

6. The vibration sensor as claimed in claim 5, wherein the cantilever correspondingly defines a receiving slot on the inner surfaces of each guiding cutout, the receiving slot extends along the longitudinal direction of the cantilever from the first end surface to the second end surface.

7. The vibration sensor as claimed in claim 6, the resistor comprises a main body and a connecting end, the connecting end is bent perpendicularly to one end of the main body for connecting the first pin and the second pin, the main bodies of the resistors are correspondingly received in the receiving slots, the connecting ends of the resistors contacts with the second end surface.

8. The vibration sensor as claimed in claim 7, wherein the each second connecting rod of the first pin and the second pin get through two of the through holes from the outer bottom surface to the blind holes correspondingly, the connecting ends of the same cantilever are connected to the second connecting rods of the first and second pins.

9. The vibration sensor as claimed in claim 1, wherein the conducting ring is a flat circular ring and comprises an inner peripheral side, an outer peripheral side, the conducting parts and the insulation parts are circular segments of the conducting ring interspaced with each other, the thickness of the conducting ring is substantially in accordance with a distance between the parallel inner surfaces of each cantilever.

* * * * *